United States Patent [19]

Marciano-Agostinelli et al.

[11] Patent Number: 4,963,695
[45] Date of Patent: Oct. 16, 1990

[54] POWER CABLE WITH METALLIC SHIELDING TAPE AND WATER SWELLABLE POWDER

[75] Inventors: Fabrizio Marciano-Agostinelli, Columbia, S.C.; Marco Barbaro-Forleo, Short Hills, N.J.; Paul L. Cinquemani, Lexington; Michael D. Buckweitz, Greenwood, both of S.C.

[73] Assignee: Pirelli Cable Corporation, Union, N.J.

[21] Appl. No.: 287,486

[22] Filed: Dec. 20, 1988

Related U.S. Application Data

[60] Continuation-in-part of Ser. No. 68,670, Jul. 1, 1987, abandoned, which is a division of Ser. No. 864,196, May 16, 1986, Pat. No. 4,703,132.

[51] Int. Cl.$^5$ .................... H01B 7/23 R; H01B 13/00
[52] U.S. Cl. ................... 174/23 C; 156/48; 174/23 R; 174/102 SC; 174/105 SG
[58] Field of Search ............ 174/23 R, 23 C, 102 SC, 174/105 SG; 156/48

[56] References Cited

U.S. PATENT DOCUMENTS

| | | | |
|---|---|---|---|
| 3,347,974 | 10/1967 | Arendt et al. | 174/23 R |
| 3,558,801 | 1/1971 | Eilhardt | 174/23 CX |
| 3,651,244 | 3/1972 | Silver et al. | 174/36 |
| 3,943,271 | 3/1976 | Bahder et al. | 174/102 DX |
| 4,095,039 | 6/1978 | Thompson | 174/102 DX |
| 4,104,480 | 8/1978 | Thompson | 174/23 C |
| 4,105,619 | 8/1978 | Kaufman et al. | 174/23 CX |
| 4,130,450 | 12/1978 | Bahder et al. | 156/47 X |
| 4,145,567 | 3/1979 | Bahder et al. | 174/107 |
| 4,398,058 | 8/1983 | Gerth et al. | 174/107 X |
| 4,435,613 | 3/1984 | Gaubert | 174/23 CX |
| 4,703,132 | 10/1987 | Marciano-Agostinelli et al. | 174/23 R |
| 4,791,240 | 12/1988 | Marin et al. | 174/23 C |

FOREIGN PATENT DOCUMENTS

| | | | |
|---|---|---|---|
| 2808214 | 9/1979 | Fed. Rep. of Germany | 174/23 R |
| 7210976 | 2/1973 | Netherlands | 174/23 C |
| 2080998 | 2/1982 | United Kingdom | 174/230 |
| 2113453 | 8/1983 | United Kingdom | |

Primary Examiner—Morris H. Nimmo
Attorney, Agent, or Firm—Brooks Haidt Haffner & Delahunty

[57] ABSTRACT

A high voltage electrical power cable with a longitudinally folded, smooth or corrugated, metal strip around a plurality of layers around the conductor and a water swellable material at least at the adjacent edges of the strip. Preferably, the water swellable material is included with a polymeric material which is flowable at a temperature at least as low as 100° C., the polymeric material has a 100 gram needle penetration value in the range from 50–100 tenths of a millimeter at 25° C. and the water swellable material has a particle size not greater than 200 microns.

34 Claims, 3 Drawing Sheets

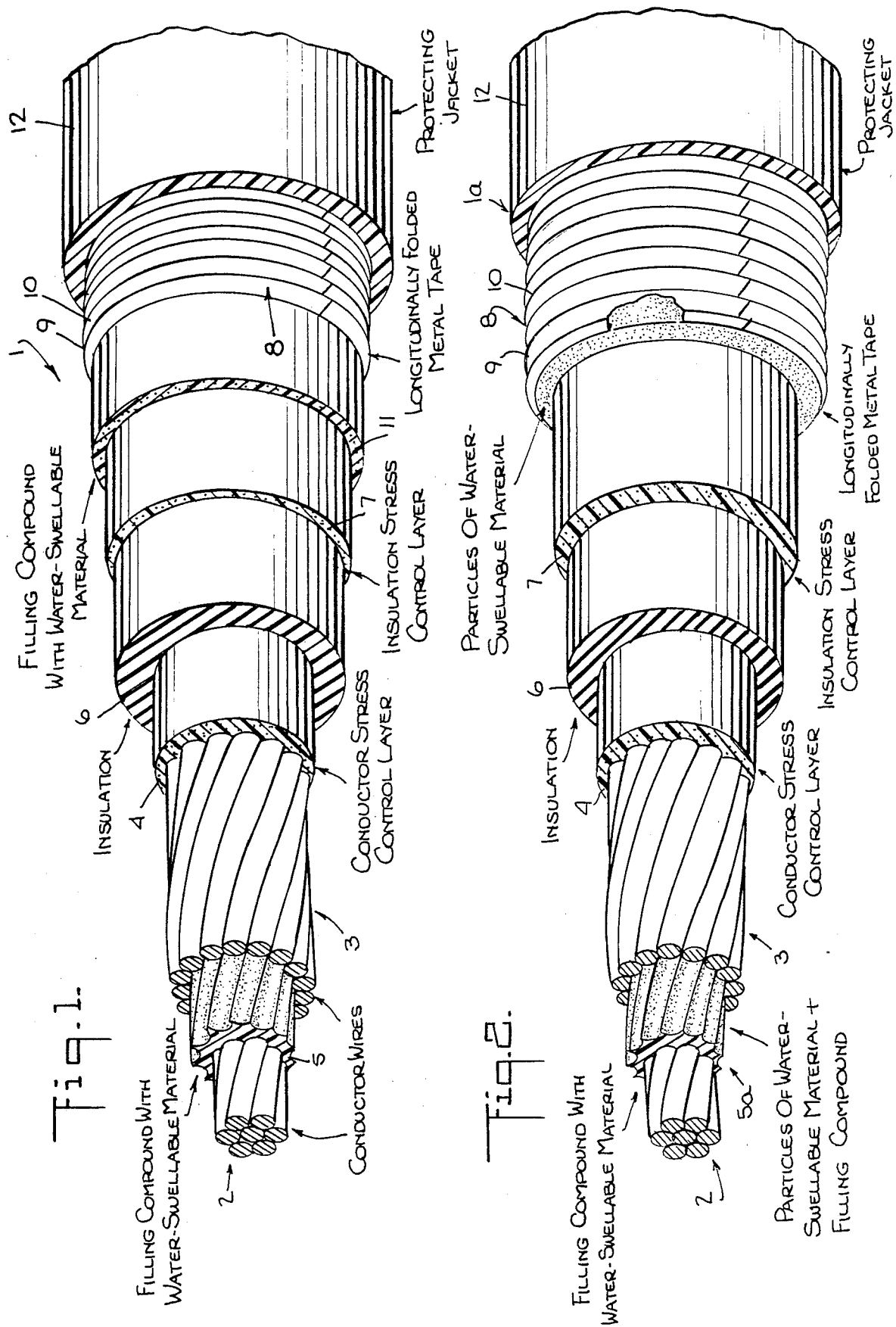

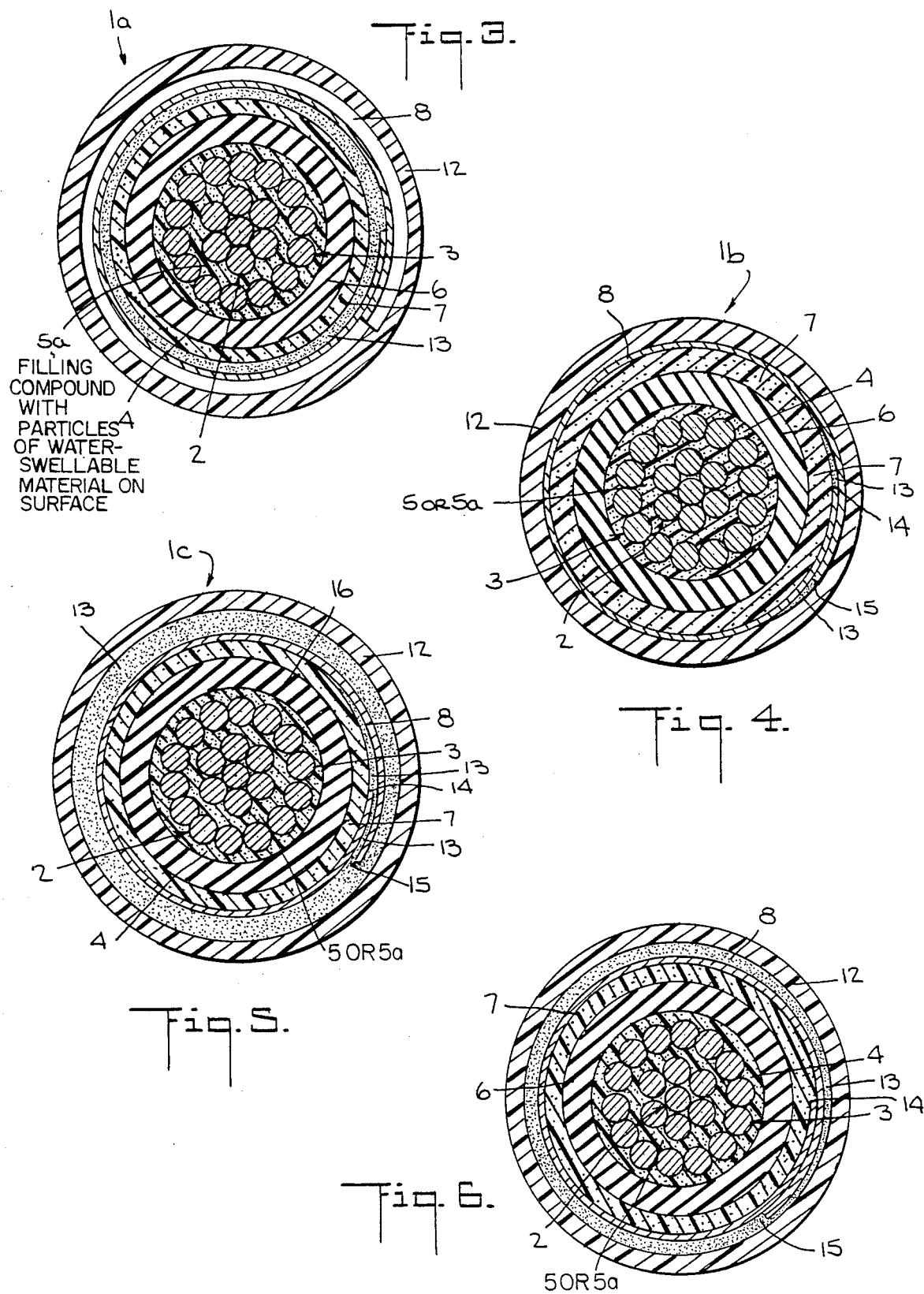

POWER CABLE WITH METALLIC SHIELDING TAPE AND WATER SWELLABLE POWDER

This application is a continuation-in-part of copending application Ser. No. 068,670, filed Jul. 1, 1987, now abandoned and entitled Filling Compound for Multi-Wire Conductor of an Electrical Cable and Cables Including Such Compound which is a division of application Ser. No. 864,196filed May 15, 1986, now U.S. Pat. No. 4,703,132, the disclosures of which are incorporated herein by reference.

BACKGROUND OF THE INVENTION

High voltage electrical power cables having a longitudinally folded, corrugated or smooth,, metallic shielding tape with overlapping edge portions or abutting, or substantially abutting, edge faces are well known in the art. See, for example, U.S. Pat. Nos. 3,651,244; 3,943,271 and 4,130,450. Such cables include a central stranded conductor with a semi-conducting shield thErearound which is covered by a layer of insulation. Insulation shielding, in the form of a semi-conducting layer, is around the insulation, and a longitudinally folded, smooth or corrugated metallic tape is around the insulation shield. A protecting jacket is disposed around the metallic tape.

It is also known in the art that when the insulation of such cables is exposed to moisture, such as when they are installed underground, "electrochemical trees" are formed in the insulation which shorten the life of the cable.

Furthermore, attempts have been made to prevent the formation of such "trees" by introducing a sealant between the straNds of the conductor and between the insulation shield and the metallic shielding tape. See said U.S. Pat. Nos. 3,943,271 and 4,130,450. However, it has been found that the mere introduction of sealant into such spaces is not entirely satisfactory when the sealant is merely asphalt/rubber or a polyester compound whiCh is not water swellable.

For example, voids may be formed in the sealant during the application thereof or may be formed when the cable is punctured accidentally. Furthermore, the components of such a cable, being made of different materials, have different coefficients of expansion, and the components are subjected to different or varying temperatures during manufacture, storage and/or operation of the cable which can cause the formation of voids.

In addition, when the edge portions of the metallic shielding tape overlap, there is a small space between the overlapping tape and the insulation shield adjacent to the edge of the underlying tape and there may be some spaces between the overlapping edge portions of the tape. If the tape is corrugated, there are spaces between the humps of the corrugations and the insulation shield. Such spaces may not be completely filled by the sealant when it is applied, but even if they are, voids can develop at such spaces when the cable, or its components, is subjected to temperature changes.

Any such voids form locations for the ingress of moisture which can cause the formation of the deleterious "electrochemical trees" in the cable insulation, and the conventional sealants used in the cables, being unaffected physically by water, cannot eliminate such voids.

BRIEF SUMMARY OF THE INVENTION

The invention relates to improvements in cables of the type described in the three first-mentioned patents.

In the preferred embodiment of the invention, in addition to treating the conductor with a water swellable material as described in said U.S. Pat. No. 4,703,132, water swellable material, either on the surface of an underlying layer or as part of the filling compound described in the last-mentioned said patent, is included in the spaces outszide the insulation shield where voids can form. Thus, the water swellable material can be between the insulation shield and the metallic tape, between the overlapping edge portions of the tape and/or between the metallic tape and the cable jacket, and preferably, is in all such places. In this way, the voids are filled by the water swellable material which absorbs moisture and swells preventing further migration of the moisture.

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIG. 1 is a cut-away perspective view of a cable of the invention with the filling compound containing particles of a water swellable material filling all spaces between the conductor wires except for the interstices which are filled by the semi-conducting stress control layer and filling spaces between an insulation stress control layer and a longitudinally folded, corrugated, metal, shielding tape or strip;

FIG. 2 is similar to FIG. 1 except that the filling compound, with or without particles of a water swellable material therein, which fills the spaces between the conductor wires has a thin layer of said particles applied to the surface or surfaces thereof and the filling compound between the metal tape and the insulation stress control layer is replaced by particles of a water swellable material;

FIG. 3 is an axial cross-section of FIG. 2;

FIG. 4 is an axial cross-section of a further embodiment of the invention similar to the preceding embodiments except that the particles of water swellable material outside the insulation stress control layer are disposed only adjacent the overlapped edges of the folded metal tape;

FIG. 5 is an axial cross-section of a further embodiment of the invention similar to embodiment shown in FIG. 4 with the water swellable particles inside the metal strip, between the overlapped edge portions of the strip and in any spaces adjacent the edge faces of the strip;

FIG. 6 is an axial cross-section of a further embodiment of the invention similar to the embodiments shown in FIGS. 4 and 5 with the water swellable particles filling the outer valleys in the corrugations of the metal tape.

DETAILED DESCRIPTION OF EMBODIMENTS OF THE INVENTION

Figure 7:
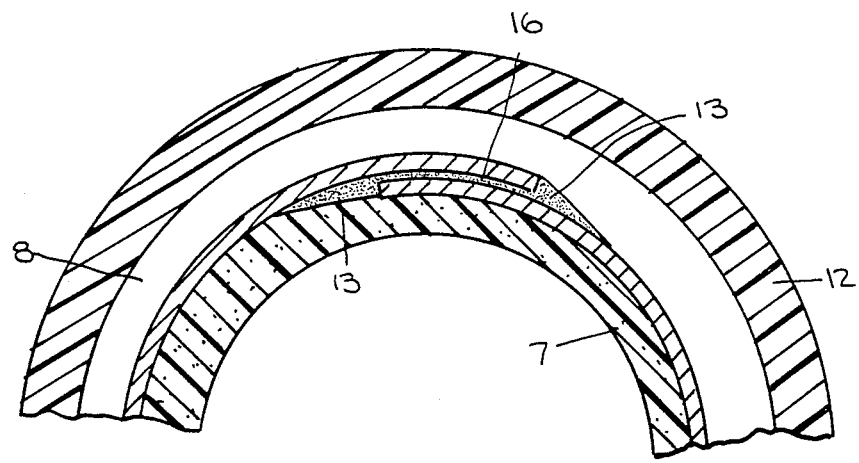
FIGS. 7 and 8 are partial, fragmentary, axial cross-sections of the cable layers outwardly of the invention stress control layer and illustrate, respectively, bonding of the overlapped edges of the metal tape with a polymeric adhesive and welding together of abutting edges of the metal tape.

Although the invention is applicable to other high voltage electrical power cables, the invention will be described in connection with the cable having the components described in said U.S. Pat. No. 4,703,132 plus a metal shield and a jacket of the type described in said U.S. Pat. No. 3,651,244.

As described in said U.S. Pat. No. 4,703,132, the cable 1 shown in FIG. 1 comprises inner stranded wires 2, e.g. of copper or aluminum, and outer stranded wires 3 of the same metal. The number of wires and the number of layers of wires may be greater or lesser.

The wires 3 are covered with a layer 4 of a semi-conductive plastic material to provide a conductor stress control layer. Any interstices between the wires 3, not filled by the material of the layer and between the wires 2 and the wires 3 are filled with a filling compound 5, preferably the filling compound described in U.S. Pat. No. 4,703,132. Such filling compound can have particles of a water swellable material admixed therein or applied to the surfaces of the filling compound as it is applied to the wires.

The conductor stress control layer 4 is encircled by a layer 6 of polymeric insulation which in turn is encircled by an insulation stress control layer 7 of semi-conductive plastic material which may be the same as the material used for the layer 4.

In FIG. 1, the layer 7 is encircled by a longitudinally folded, corrugated metal tape or strip 8 of good conductivity metal, such as copper or aluminum, to provide an electrostatic shield. The corrugations extended transversely to the length of the strip 8 and provide humps 9 interposed with valleys 10, the humps 9 extending radially outwardly and the valleys extending radially inwardly after the strip 8 is folded.

In the embodiments illustrated in FIGS. 1-6, the stirp 8 has overlapping edge portions, but the edge faces of the strip can abut or be separated by a narrow spacing in each of the embodiments. As will be apparent, strips with overlapping, edge portions or with abutting and narrowly spaced edge faces have their edge portions adjacent to each other.

Also, in the embodiments illustrated in FIGS. 1-6, the strip 8 is transversely corrugated, but if desired, the strips 8 may lack corrugations, e.g. have plane surface. Preferably, however, the strip 8 is transversely corrugated.

The strip 8 is encircled by a plastic protecting jacket 12.

In FIG. 1, intermediate the strip 8 and the insulation stress control layer 7, there is a layer 11 of a polymeric filling compound having particles of a water swellable material therein or on one or more of the surfaces thereof. Preferably, the filling compound is the filling compound described in said U.S. Pat. No. 4,703,132 and preferably, the particles of water swellable material and the particle size thereof is as described in said U.S. Pat. No. 4,703,132. Preferably, also, the filling compound is extrudable, is flowable at a temperature in the range from 15° C. to 100° C. and is semi-conductive. Such flowability is desired to permit, the filling compound to fill, or substantially fill, the humps 9 in the corrugations when the strip 8 is folded around the layer 11, and semi-conductivity is desired to conductively interconnect the strip 8 with the insulation stress control layer 7.

FIGS. 2 and 3 illustrate another embodiment of the cable of the invention, cable 1a, which differs from the embodiment shown in FIG. 1 in that the filling compound 5 for the wires 2 and 3 do not have the particles of water-swellable material admixed therein, and instead, the particles are applied to the surfaces of the filling compound as it is applied to the wires as described in said U.S. Pat. No. 4,703,132. In addition, the filling compound 11 is replaced by particles 13 of water-swellable material. Preferably, such particles are the same as, and have the particle size of, the particles described in said U.S. Pat. No. 4,703,132. Preferably, also, the particles 13 fill, or substantially fill, all the spaces between the strip 8 and the layer 7 including the spaces within the humps 9.

FIG. 4 illustrates another embodiment of the cable of the invention, cable 1b, which differs from the embodiment shown in FIGS. 2 and 3 in that the particles 13 of water-swellable material are present outside the layer of insulation 6, only in the gaps formed adjacent to the edge faces 14 and 15 of the strip 8.

FIG. 5 illustrates another embodiment of the cable of the invention, cable 1c, which differs from the embodiment shown in FIG. 4 in that the particles 13 are not only in the gaps adjacent to the edge faces 14 and 15, but are also in the humps 9 of the corrugations in the strip 8 and between the overlapping edge portions of the strip 8. Preferably, the particles 13 fill the humps 9. In the construction shown in FIG. 5, the use of particles 13 between the overlapping edge portions of the strip 8 is preferred, but such particles can be omitted.

A further embodiment of the cable of the invention, cable 1d, is illustrated in FIG. 6, and such cable differs from the cable 1c shown in FIG. 4 in that the particles 13 within the strip 8 and between the overlapping edge portions thereof are omitted, and the particles 13 are present at the outer surface of the strip 8 and preferably, fill the valleys 10. Of course, it will be apparent that the particles 13 also fill any gap at the face 15 of the strip 8, and preferably, any gap at the face 14 is also filled with the particles 13.

In the embodiments described hereinbefore, the overlapping edge portions of the strip 8 are not bonded to each other and are free to slide in the circumferential direction with respect to each other. However, in the various embodiments, except the embodiment shown in FIG. 5, where the particles 13 are between the overlapping edge portions, the edge portions may be adhesively bonded together by a polymeric adhsive. Thus, as shown in FIG. 7, the overlapping edge portions of the strip 8 are bonded together by a polymeric adhesive 16. Although the particle 13 arrangement of FIG. 4 has been illustrated in FIG. 7, it will be apparent that the other particle 13 arrangements shown in the various other FIGS. may be employed instead.

In the hereinbefore described embodiments, the edge portions of the strip 8 have been shown in overlapping relation. In the event that the edge faces of the strip 8 are in closely spaced, facing relation, any gap between the edge faces, i.e. 14 and 15 can be filled with the particles 13, and the particles 13 may be disposed intermediate the strip 8 and the insulation-stress control layer 7, either by themselves or as part of the filling compound 11 as described hereinbefore.

Figure 8:
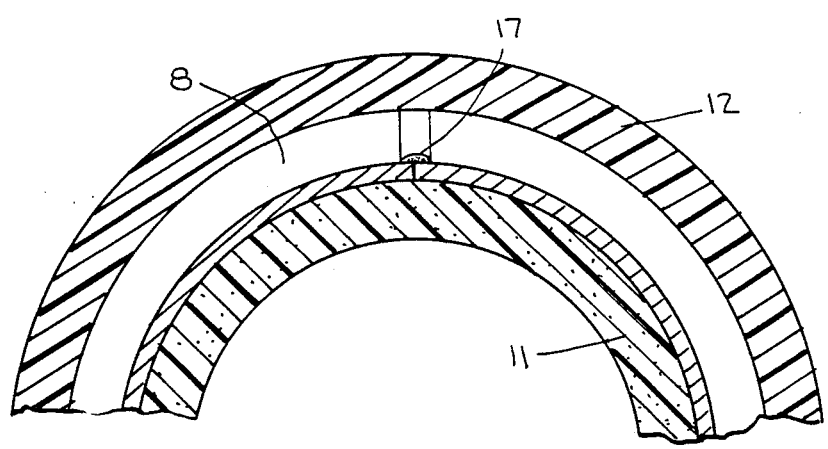

If the edge faces 14 and 15 are narrowly spaced or abutting, the edges can be welded together as indicated at 17 in FIG. 8. As indicated in FIG. 8, the previously described filling compound layer 11 can be disposed inwardly of the strip 8, or particles 13 by themselves may be disposed inwardly of the strip 8 as described in connection with FIGS. 2 and 3 or alternatively, or in addition, the particles 13 can be disposed at the outer surface of the strip 8.

It will be observed from an examination of each of the described embodiments that the particles 13 of water-swellable material, either by themselves or as part of the filling compound, are disposed at least at the adjacent edges of the strip 8. However, it is preferred that the particles 13 be disposed at all places in the cable exteriorly of the insulation stress control layer 7 where gaps can occur due to manufacturing, puncturing or temperature causes and that such particles 13 also be disposed in any interstices radially inwardly of the conductor stress control layer 4.

Although preferred embodiments of the present invention have been described and illustrated, it will be apparent to those skilled in the art that various modifications may be made without departing from the principles of the invention.

We claim:

1. In an electrical power cable comprising a stranded conductor formed by a plurality of wires stranded together and in conductive contact with adjacent wires, particles of water swellable material within any interstices in said conductor, a semi-conductive stress control layer around said conductor, a layer of insulation around said stress control layer, a semi-conductive insulation shield of substantially constant cross-sectional radius around said insulation and a longitudinally folded strip of metal with circumferentially spaced edges around said insulation shield, said strip being corrugated transversely to its length to provide outwardly extending humps and intermediate valleys and having its edges extending longitudinally of said cable and being adjacent to each other but with a space at the face of one of said edges between it and the adjacent portion of the strip, the improvement comprising particles of a water swellable material at least in said space at the adjacent edges of said strip.

2. An electrical power cable as set forth in claim 1 wherein edge portions of said metal strip are overlapped and said space is at the underlying edge face.

3. An electrical power cable as set forth in claim 2 wherein said overlapping edge portions are bonded together by a polymeric adhesive.

4. An electrical power cable as set forth in claim 1 wherein edge faces of said metal strip face each other and said space is intermediate said edge faces.

5. In an electrical power cable comprising a stranded conductor formed by a plurality of wires stranded together and in conductive contact with adjacent wires, a semi-conductive stress control layer around said conductor, a layer of insulation around said stress control layer, a semi-conductive insulation shield of substantially constant cross-sectional radius around said insulation and a longitudinally folded strip of metal with circumferentially spaced edges around said insulation shield, said strip having its edges extending longitudinally of said cable and being adjacent to each other but with a space at the fence of one of said edges between it and the adjacent portion of the strip, the improvement comprising particles of a water swellable material at least in said space at the adjacet edges of said strip.

6. An electrical power cable as set forth in claim 5 wherein edge portions of said metal strip are overlapping and said space is at the underlying edge face.

7. An electrical power cable as set forth in claim 6 wherein said overlapping edge portions are bonded together by a polymeric adhesive.

8. An electrical power cable as set forth in claim 5 wherein edge faces of said metal strip face each other and said space is intermedaite said edge faces.

9. An electrcal power cable as set forth in claim 5 wherein said particles of water swellable material are distributed around the cirumference of the surface of said insulation shield.

10. An electrical power cable as set forth in claim 9 wherein edge portions of said strip are overlapping and wherein said particles of a water swellable material are intermediate said overlapping edge portions.

11. An electrical power cable as set forth in claim 5 wherein said strip is corrugated transversely to its length to provide outwardly extending humps and intermediate valleys extending circumferentially of said insulation shield.

12. An electrical power cable as set forth in claims 11 wherein said particles of a water swellable material are within the humps in said strip.

13. An electrical power cable as set forth in claim 11 wherein said particles of a water swellable material are in the valleys of said strip of the external surface of said strip.

14. An electrical power cable as set forth in claim 13 wherein edge portions of said strip are overlapping and said particles of a water swellable material are also intermediate said edge portions.

15. An electrical power cable as set forth in claim 5 further comprising particles of a water swellable material within any interstices in said conductor.

16. In an electrical power cable comprising a stranded conductor formed by a plurality of wires stranded together and in conductive contact with adjacent wires, a semi-conductive stress control layer around said conductor, a layer of insulation around said stress control layer, a semi-conductive insulation shield of substantially constant cross-sectional radius around said insulation and a longitudinally folded strip of metal with circumferentially spaced edges around said insulation shield, said strip having overlapping edge portions extending longitudinally of said cable and adjacent each other but with a space at the face of one of said edges between it and the adjacent portion of the strip and being corrugated transversely of its length to provide outwardly extending humps and intermediate valleys extending circumferentially of said insulation shield and a jacket around said folded strip, the improvement comprising:

filling compound filling any interstices in said conductor and being intermediate at least a longitudinally extending portion of said strip and said insulation shield and in said space, said filling compound comprising a polymeric material which is flowable at a temperature at least as low as 100° C. and which has particles of a water swellable material in contact therewith.

17. An electrical power cable as set forth in claim 16 wherein the filling compound intermediate said strip and said insulation shield has said particles of water swellable material admixed with said polymeric material and the mixture fills the interior of said humps.

18. An electrical power cable as set forth in claim 17 wherein said filling compound intermediate said strip and said insulation shield contains particles of a conductive material in an amount sufficient to make said mixture semi-conductive.

19. An electrical power cable as set forth in claim 18 wherein the last-mentioned said filling compound contacts and encircles said insulation shield.

20. An electrical power cable as set forth in claim 16 wherein said filling compound is intermediate said overlapping edge portions.

21. A method of making an electrical power transmission cable having a plurality of layers of uninsulated wires thereby providing an outer layer of wires and an inner layer or layers of wires, said method comprising:
   bringing together said wires into conductive contact while applying flowable polymeric compound around at least the said wires forming the inner layer or layers;
   putting particles of a water swellable material having a particles size not greater than 200 microns into contact with said polymeric compound which is applied around said wires forming said inner layer or layers;
   extruding a first layer of semi-conductive material around said wires;
   extruding a layer of insulation around said layer of semi-conductive material;
   extruding a second layer of semi-conductive material of substantially constant cross-sectional radius around said layer of insulation;
   longitudinally folding a metallic strip around said second layer so as to provide overlapping edge portions extending longitudinally of the cable said edges being adjacent to each other but with a space at the face of one of said edges between it and the adjacent portion of the strip; and
   applying particles of a water swellable material adjacent the edge portions of said strip prior to completion of the folding of said strip so as to provide said particles at least in said space.

22. A method as set forth in claim 21 wherein the second-mentioned said particles are applied intermediate said overlapping edge portions.

23. A method as set forth in claim 21 wherein the second-mentioned said particles are applied intermediate the interior surface of said strip and said insulation shield.

24. A method as set forth in claim 23 wherein the second-mentioned said particles are admixed with a flowable polymeric compound before the last-mentioned said particles are applied.

25. A method as set forth in claim 24 wherein semi-conductive particles are added to the mixture of the last-mentioned said particles and said polymeric compound in an amount sufficient to make the resulting mixture semi-conductive.

26. In an electrical power cable comprising a stranded conductor formed by a plurality of wires stranded together and in conductive contact with adjacent wires, particles of water swellable material within any interstices in said conductor, semi-conductive stress control layer around said conductor, a layer of insulation around said stress control layer, a semi-conductive insulation shield of substantially constant cross-sectional radius around said insulation and an elongated metal element radially outwardly of said insulation shield, said element having its edges extending longitudinally of said cable and adjacent to each other but with a space at the face of one of said edges between it and the adjacent portion of the strip and the improvement compising particles of a water swellable material at least in said space at the adjacent edges of said element.

27. In an electrical power cable comrpising a stranded conductor formed by a plurality of wires stranded together, a semi-conductive stress control layer around said conductor, a layer of insulation around said stress control layer, a semi-conductive insulation shield around said insulation and a longitudinally folded strip of metal around said insulation shield, said strip having its edges extending longitudinally of said cable and being adjacent to each other, and said strip being corrugated transveresely to its length to provide outwardly extending humps and intermediate valleys extending circumferentially of said insulation shield, the improvement comprising particles of a water swellable material admixed with an extrudable polymeric material and filling said humps at the interior thereof, said polymeric material having a 100 gram needle penetration value between 50 and 100 tenths of a millimeter at 25° C. and said particles of water swellable material having a size not greater than 200 microns.

28. An electrical power cable as set forth in claim 27 wherein said mixture fills any interstices in said conductor.

29. In an electrical power cable comprising a stranded conductor formed by a plurality of wires stranded together, a semi-conductive stress control layer around said conductor, a layer of insulation around said stress control layer, a semi-conductive insulation shield around said insulation and a longitudinally folded strip of metal around said insulation shield, said strip having overlapping edge portions extending longitudinally of said cable and being corrugated transversely of its length to provide outwardly extending humps and intermediate valleys extending circumferentially of said insulation shield and a jacket around said folded strip, the improvement comprising:
   a filling compound filling any interstices in said conductor and being intermediate at least a longitudinally extending portion of said strip and said insulation shield, said filling compound comprising a polymeric material which is flowable at a temperature at least as low as 100° C. and which has a 100 gram needle penetration value between 50 and 100 tenths of a millimeter at 25° C. and which has particles of a water swellable material in contact therewith, said particles of water swellable material having a size not greater than 200 microns.

30. In an electrical power cable comprising a stranded conductor formed by a plurality of wires stranded together, a semi-conductive stress control layer around said conductor, a layer of insulation around said stress control layer, a semi-conductive insulation shield around said insulation and a longitudinally folded strip of metal around said insulation shield, said strip having its edges extending longitudinally of said cable and being adjacent to each other, said strip also being corrugated transversely to its length to provide outwardly extending humps and intermediate valleys extending circumferentially of said insulation shield, the improvement comprising particles of a water swellable material admixed with an extruddable polymeric material at least at the adjacent edges of said strip, the mixture of said particles and said polymeric material also filling said humps at the interior thereof.

31. An electrical power cable as set forth in claim 30 wherein said mixture fills any interstices in said conductor.

32. An electrical power cable as sett forth in claim 30 wherein said mixture further comprises particles of a conductive material in an amount sufficient to make the mixture semi-conductive and the mixture is in contact with both said strip and said insulation shield.

33. In an electrical power cable comprising a stranded conductor formed by a plurality of wires stranded together, a semi-conductive stress control layer around said conductor, a layer of insulation around said stress control layer, a semi-conductive insulation shield around said insulation and a longitudinally folded strip of metal around said insulation shield, said strip having its edges extending longitudinally of said cable and being adjacent to each other, the improvement comprising particles of a water swellable material admixed with an extrudable polymeric material at least at the adjacent edges of said strip and within any interstices in said conductor.

34. An electrical power cable as set forth in claims 33 wherein said particles of a water swellable material at the adjacent edges of said strip are admixed with an extrudable polymeric material and with particles of a conductive material in an amount sufficient to make the mixture semi-conductive.

* * * * *

UNITED STATES PATENT AND TRADEMARK OFFICE
CERTIFICATE OF CORRECTION

PATENT NO. : 4,963,695

DATED : October 16, 1990

INVENTOR(S) : Marciano-Agostinelli, et al

It is certified that error appears in the above-identified patent and that said Letters Patent is hereby corrected as shown below:

On the title page item [73] should read --Marco Barbaro-Forleo,

Montreal, Quebec, Canada H3Y 1K2--.

Signed and Sealed this

Twenty-sixth Day of February, 1991

*Attest:*

HARRY F. MANBECK, JR.

*Attesting Officer*      *Commissioner of Patents and Trademarks*